Feb. 3, 1959  R. A. THIENEMANN  2,872,025
CONTROL UNIT FOR COMPOSING MACHINES
Filed Dec. 24, 1956  4 Sheets-Sheet 2

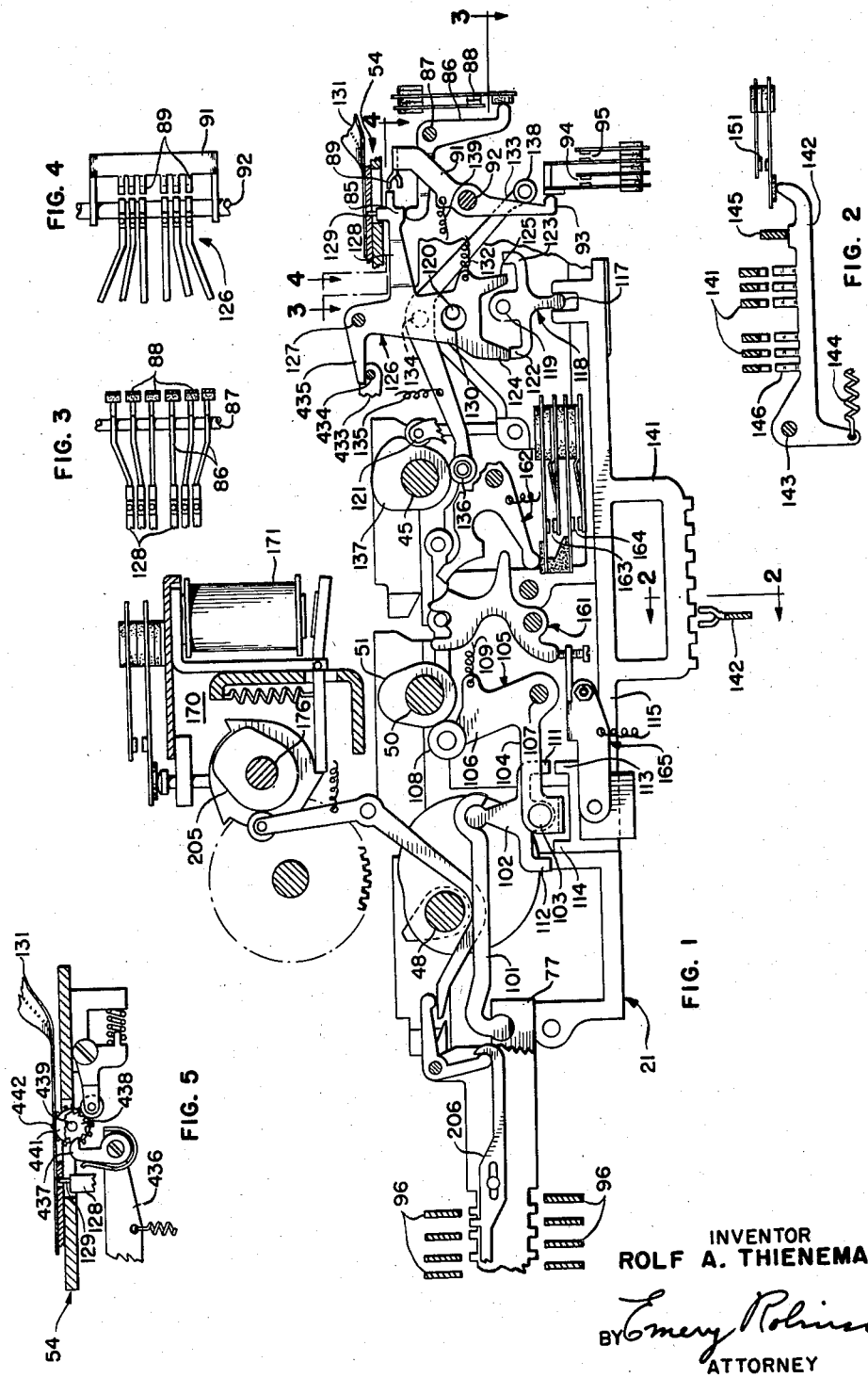

INVENTOR
ROLF A. THIENEMANN
BY Emery Robinson
ATTORNEY

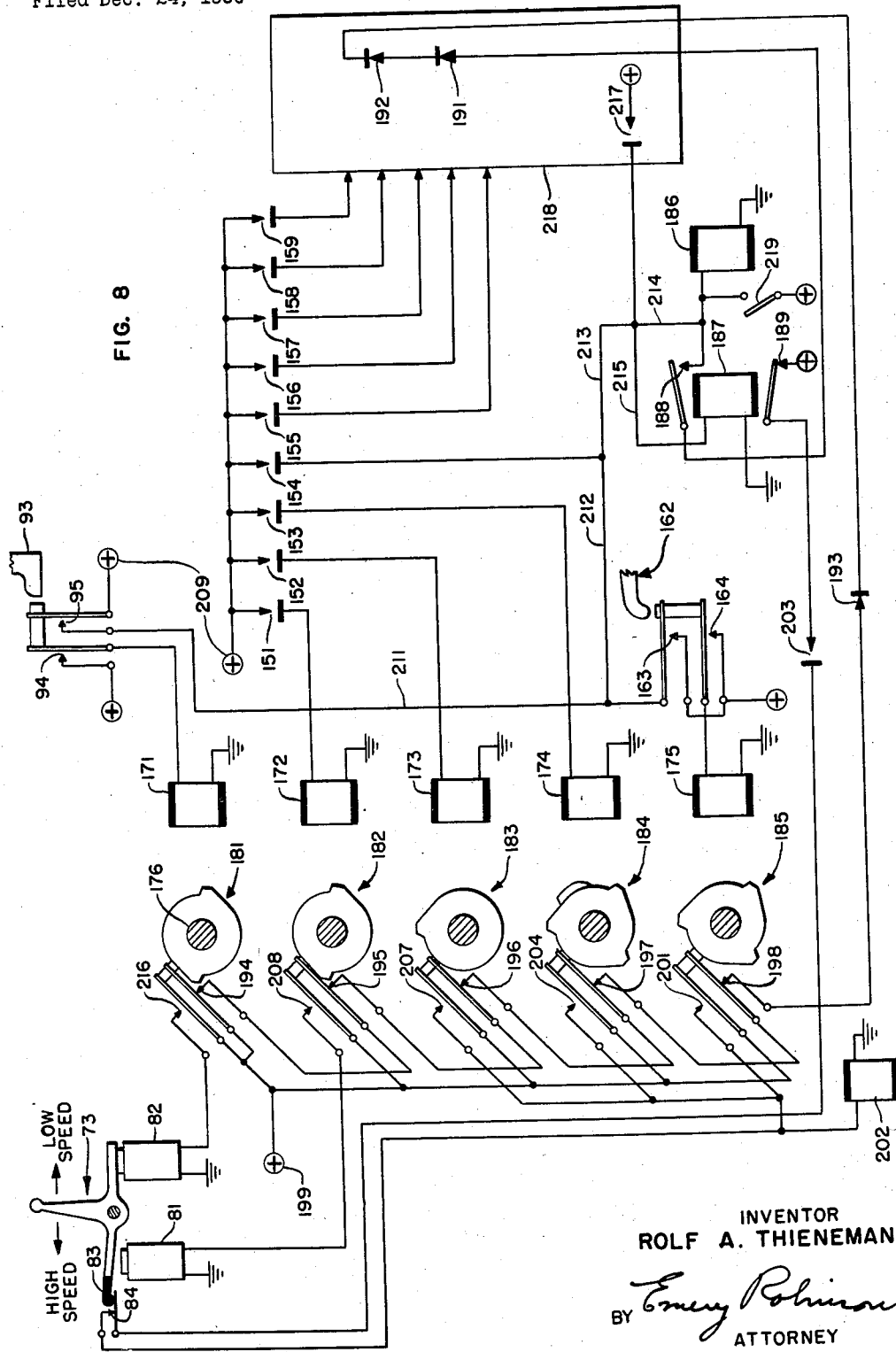

United States Patent Office 2,872,025
Patented Feb. 3, 1959

2,872,025

CONTROL UNIT FOR COMPOSING MACHINES

Rolf A. Thienemann, Chicago, Ill., assignor, by mesne assignments, to Fairchild Camera & Instrument Corporation, a corporation of Delaware Application December 24, 1956, Serial No. 630,126

9 Claims. (Cl. 199—18)

This invention relates to improvements in signal responsive apparatus for the automatic control of linecasting and composing machines.

Automatic control mechanisms are known that may be applied to standard types of linecasting machines without changing the manual operating features thereof and retaining the characteristic features peculiar to these machines. Such an automatic control mechanism is disclosed in United States Patent No. 2,786,567, issued March 26, 1957, to M. T. Goetz.

The present invention embraces improvements in the arrangement covered in said patent and has for its principal object the provision of facilities for affording more efficient operation of certain functions.

Specifically, the automatic control mechanism is controlled by a perforated tape or control form which may be prepared by the operation of a perforator such as disclosed in United States Patent No. 2,059,250, granted November 3, 1936, to H. L. Krum, and which is fed through a record reading device, wherein there is provided a plurality of feeler members, each one of which corresponds to a position in the tape that may or may not be provided with a perforation, depending upon the particular code combination that is being read or sensed. Upon each momentary arrest of the control form, the several feelers sense the code combination perforated in the particular position and upon the next movement the combination is transferred to an intermediate set of storage devices following which a set of code bars are also positioned in accordance with such combination. For each permutation of the code bars one and only one of a plurality of selectable elements is placed into selectable position to control a predetermined function in the composing machine. A cam shaft which is constantly rotated during the normal operation of the reading device serves to reset the selectable elements. It is sometimes desired to feed the perforated tape through the record reading device without causing the operation of the automatic control mechanism, thereby suppressing the information perforated in that section or portion of the tape. Moreover, it is desired at such times to feed the suppressed portions through the record reading device at a greater rate of speed. Thus, the device according to the present invention provides facilities, whereby unwanted information punched in the tape may be suppressed under the control of special code indicia in the tape, and the feeding or stepping of the tape may be speeded up during the effectuation of the suppression function.

A better understanding of the present invention will be obtained from the following description, taken in conjunction with the accompanying drawings wherein:

Fig. 1 is a longitudinal cross-sectional view through the record reader mechanism and associated parts;

Fig. 2 is a cross-sectional view taken on line 2—2 of Fig. 1;

Fig. 3 is a cross-sectional view taken on line 3—3 of Fig. 1;

Fig. 4 is a cross-sectional view taken on line 4—4 of Fig. 1;

Fig. 5 is a fragmental sectional view showing the tape feeding arrangement;

Fig. 8 is a schematic circuit diagram of the timing mechanism according to the present invention.

Figures 6, 7:
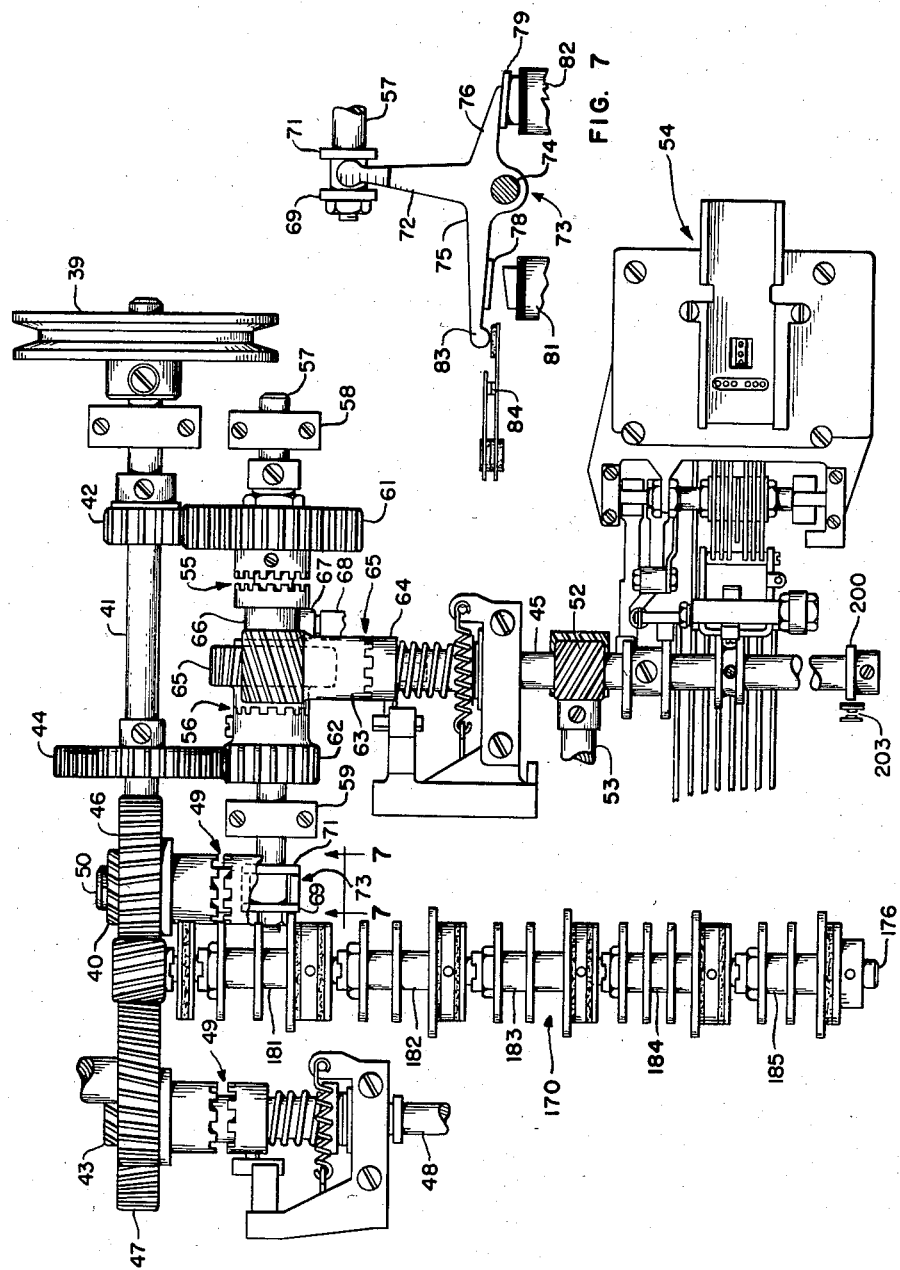
Fig. 6 is a fragmental top view of the tape reader and associated parts.
Fig. 7 is a view taken on line 7—7 of Fig. 1, showing the gear shift control device.
Figure 9:
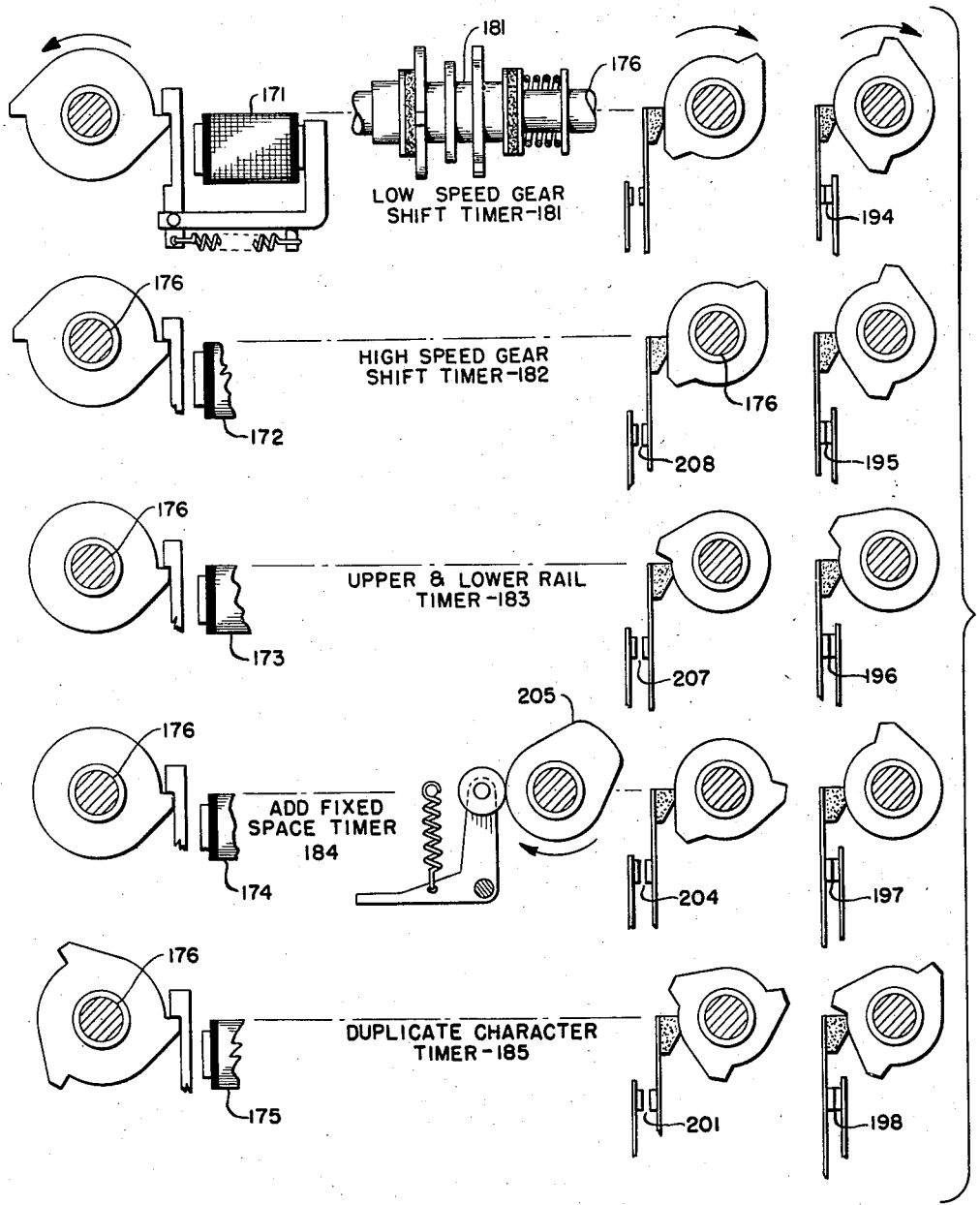
Fig. 9 is a diagrammatic view showing the timing cams and contacts.

Referring now to the accompanying drawings in which like reference characters designate similar parts throughout the several views, Figs. 1 and 5 illustrate views corresponding to Figs. 10 and 12, respectively, of the aforementioned Patent No. 2,786,567. Having reference to Fig. 1 the series of code bars 77 is provided with notches and wards on both top and bottom edges thereof, and in this manner they accommodate a double alignment of selectable bars or function determining elements 96. As clearly disclosed in said Patent No. 2,786,567, each of the selectable bars 96 is assigned to control the release of a matrix or spaceband. The right-hand portions of code bars 77 are pivotally articulated to one end of individually associated links 101, the other ends of which are pivotally articulated to individually associated T-shaped transfer levers 102, which are carried pivotally on a pivot shaft 103 mounted in the extremity of one arm 104 of a transfer lever bail 105 comprising arms 104 and 106 pivotally mounted on a pivot shaft 107 appropriately located in the frame 21. Transfer bail 105 carries at the extremity of arm 106 a cam follower roller 108 which cooperates with the transfer cam 51 fixed to shaft 50. Clockwise bias is normally imparted to lever 105 by a spring 109 to hold the roller 108 against the periphery of cam 51.

Transfer levers 102 are provided with a pair of abutments 111 and 112 operatively related to a pair of abutments 113 and 114, respectively, formed on a series of intermediate selector bars 115 which are suitably supported in the frame 21 for longitudinal and parallel movement. The abutments 111 and 112 are so spaced that when either of the two abutments 113 or 114 is brought into registration with its associated abutment 111 or 112, the other of the abutments 113 or 114 just clears its associated abutment. Each of the intermediate selector bars 115 is pivotally articulated at its righthand end (as viewed in Fig. 1) to the arm 117 of an associated T-shaped transfer lever 118 pivotally carried on a pivot shaft 119 mounted in a transfer bail exemplified by member 121 (associated with cam 137 fixed to shaft 45) and comparable to the transfer bail 98 shown in Fig. 16 of United States Patent No. 2,091,286, issued August 31, 1937, to H. L. Krum et al. Levers 118 are provided with abutments 122 and 123 which are adapted to cooperate with abutments 124 and 125 formed on a corresponding series of tape sensing or feeler levers 126 mounted pivotally on a pivot shaft 127, approximately carried in the tape reader 54. Levers 126 are each provided with an arm 128 terminating in a tape sensing or feeler pin 129 adapted to sense a tape 131 which has been imperforated with code combinations of perforations in accordance with a six-unit permutation code (in the present embodiment). Levers 126 are provied with an intermediate orifice 130 having sufficient clearance with respect to a fixed rod 120 positioned therein so as to permit of a slight oscillatory motion by the levers 126, such motion producing a corresponding vertical reciprocating motion of arms 128 and feeler pins 129.

Individual springs 132 tend normally to urge the tape sensing levers 126 to their extreme counterclockwise position and in this way they are cyclically opposed by the action of a reciprocating bail exemplified by the bail arm 433 comparable to the bail 107 shown in Fig. 16 of said Patent No. 2,091,286. Bail 433 is comprised of a transversely extending rod 434 traversing beneath the horizontal extensions 435 integrally formed with the feeler levers 126. The reciprocating bail 433 is pivotally supported in a suitable manner and carries a cam following roller (not shown) cooperable with a cam (not shown) mounted on the shaft 45. Also mounted on shaft 45 is a tape feed cam (not shown) which operates a tape feeding device of the type shown in Fig. 10 of said Patent No. 2,091,286, which comprises an arm 436 (Fig. 5) carrying a tape feed pawl 437 which cooperates with a tape feed ratchet 438. The reciprocatory movement of pawl 437 thus imparts through ratchet 438, step-by-step motion to a feed shaft 439 which carries a sprocket feed wheel 441 whose pins 442 coincide with a central longitudinal row of perforations conventionally provided in the control form or tape 131.

Thus, in accordance with the timed action of bail 433 and bail 121, the set of feeler levers 126 will first be permitted to rotate counterclockwise (to an extent limited by stop 120) during which time those levers 126 whose pins 129 are not blocked by the record tape 131, but are brought into registration with a perforation therein, will be permitted to rotate until their respective abutments 125 register opposite the abutment 123, while the other levers 126 which are not so permitted to rotate counterclockwise will remain in the position shown in Fig. 1, with the abutment 124 in registration opposite the abutment 122.

Immediately following this condition, the transfer bail 121 is actuated counterclockwise to bring the T-levers 118 into engagement with their respective feeler levers 126 and, depending upon which of the two positions the feeler levers 126 happen to assume, T-levers 118 will be correspondingly positioned and will impart a similar positionment to their associated bars 115. In a similar manner, the combination of perforations present in each transverse alignment in the tape is transferred simultaneously through a second transfer device 104 to the six code bars 77. Following each such transfer the tape 131 is stepped forward until another transverse alignment of perforations is brought into registration with the feeler pins 129.

Particular attention is directed to the fact that while the several feeler levers 126 are brought back to a normal or starting position at some definite point in each cycle of operation, yet the transfer levers 118 and their articulated slide bars 115 are not so restored but remain in their set position until they are given a new setting upon a subsequent operation of the transfer mechanism. This practice permits of an overlap in the operation of the two sets of levers and allows the bars 115 maximum time of rest during each cycle of operation. A further overlap is provided between the operations of the bars 115 and the bars 77 by levers 102.

The transfer mechanism comprising transfer levers 118 and the transfer mechanism comprising levers 102 are operated sequentially or consecutively, and thus provide for operation of the herein disclosed control unit on a two-cycle basis; that is, the cam shaft 45 is initiated into operation to effect the reading of the tape 131 and the setting of bars 115 in conformance thereto, and near the end of its cycle of operation it initiates the cycle of operation of cam shaft 50 which causes the transference of the code setting from bars 115 to bars 77. Thus, the control unit is designed with two separate operating cycles. This two-cycle approach increases the time available at any given speed to perform certain functions, over the time which is available for the same function in prior one-cycle control systems. This is achieved because the two-cycle arrangement permits overlap so that the reading operation for a second character may be started while the actuating function of the first character is being accomplished.

Referring to Fig. 6 the shaft 41 is continuously driven through a pulley 39 affixed thereto and a belt (not shown) which is interconnected to the power shaft of the principal machine; namely, the line composing machine. Shaft 41 also carries securely mounted to it, worm pinion gears 40 and 43 and spur gears 42 and 44. Worm pinion gear 43 engages a worm wheel 47 which is freely mounted on a shaft 48 journalled in suitable bearings that comprise part of the framework 21. Likewise, worm pinion gear 40 engages a worm wheel 46 which is freely mounted on shaft 50. Each of the shafts 48 and 50 is coupled with its respective gear 47 and 46 through spring loaded toothed clutches 49 of similar and well known construction.

As mentioned in said Patent No. 2,786,567, shaft 45 carries the cams that operate the record reader mechanism 54, and will be referred to hereinafter as the record reader shaft, while in addition it also carries a driving gear 52 that operates a cam shaft 53. Shaft 45 is driven from shaft 41 through a pair of toothed clutches 55 and 56 forming part of a gear shift arrangement, whereby two different speeds are imparted to the record reader shaft 45.

The gear shift arrangement consists of shaft 57 slidably supported for endwise movement in bearings 58 and 59. Fixed to shaft 57 and maintained in meshing relation with gears 42 and 44 are gears 61 and 62, respectively. Gears 42 and 44, and 61 and 62 are of the spur gear type so as to facilitate the slidable movement of shaft 57 and gears 61 and 62, and so as not to disturb the meshing relation between the respective spur gears.

Freely carried on shaft 45 is a pinion gear 63 the hub of which is provided with the teeth adapted to cooperate with a toothed portion 64 fixed to shaft 45 to form a toothed clutch 65 of construction well known in the art, the operation of which is the same as clutch 49 shown in said Patent No. 2,786,567. Gear 63 is adapted to mesh with a gear 65 carried freely on the shaft 57. Gear 65 is provided integrally therewith with a pair of tothed hubs adapted to interengage with corresponding toothed hubs on gears 61 and 62 to form the clutches 55 and 56, respectively. One of the hubs of gear 65 is provided with a peripheral groove 66 which cooperates with a roller 67 mounted on a bracket 68 fixed to the frame 21, the function of which is to prevent lateral movement of gear 65 and yet permit rotary motion thereof.

At the left end of shaft 57 (as viewed in Figs. 6 and 7) are a pair of spaced circular flanges 69 and 71 adapted to cooperate with the forked end of arm 72 of a T-shaped member 73 mounted rockably on pivot 74. Arms 75 and 76 of member 73 are provided with pole pieces 78 and 79 which coact with electromagnets 81 and 82 controlled by the timing mechanism, hereinafter described. Arm 75 is provided with an insulated contactor 83 for operating a contact 84 for a purpose presently to be described.

As previously indicated, the present invention provides facilities, whereby unwanted information punched in the tape may be suppressed under the control of special code indicia in the tape, and the feeding or stepping of the tape may be speeded up during the effectuation of the suppression function. To achieve this result, the following tape reading instrumentalities (Fig. 1) are provided: Cooperating with depending portions 85 on arms 128 of the series of sensing levers 126 are a corresponding series of bell crank levers 86 mounted pivotally on a pivot shaft 87, the depending arms of which cooperate with a corresponding series of contacts 88 appropriately positioned in the frame 21. Contacts 88 are utilized as reading contacts which may be wired to recognize different code signals, as exemplified by the disclosure in copending application Serial No. 521,007, filed July 11, 1955, by M. T. Goetz. Also, cooperating with the extremities of arms 128 of said levers 126 are the coded projections 89 formed on a coded bail 91 carried pivotally on a pivot shaft 92. Bail 91 is provided with a depending arm 93 which is adapted to cooperate with a pair of contacts 94 and 95 also suitably mounted in the frame 21. The sensing or reading action of bail 91 is controlled by a rocker lever 133 mounted pivotally at 134. Lever 133 is normally biased clockwise by a ring 135 to hold its cam follower roller 136 against the periphery of a cam 137 carried on shaft 45. Lever 133 is also provided at the extremity of its other arm with a roller 138 which cooperates with the depending arm 93 of bail 91 to govern the sensing or reading action of bail 91. Thus, in the position shown in Fig. 1, with the cam follower roller 136 against the low part of cam 137, the roller 138 is effective against depending arm 93 to hold bail 91 in its nonreading or clockwise position against the pull of its spring 139. Then, when roller 136 rides on the high part of the cam 137, the lever 133 is in its counterclockwise position, whereat the roller 138 is swung away from the arm 93 thereby permitting bail 91 to be actuated by spring 139 to its reading or sensing position, thereby closing contacts 94 and 95 if the arrangement of code projections 89 corresponds to the code setting of arms 128.

As shown in Fig. 1, the intermediate selector bars 115 are provided with depending portions 141, in the manner disclosed in United States Patent No. 2,098,973, granted November 16, 1937, to A. H. Reiber, whereby a plurality of bails 142 are selectively actuated in accordance with the permuted arrangement of the notches and wards in the bottom edges of the depending portions 141. As indicated in Fig. 2, the bails 142 are pivotally supported on a pivot rod 143 and are biased counterclockwise by individual springs 144. A reset bail 145 normally holds the bails 142 in their clockwise position (as shown in Fig. 2) with the coded projections 146 out of engagement with the depending portions 141 of bars 115. Cyclically, the reset bail 145 permtis the bails 142 to sense the permuted setting of portions 141 so that if said setting corresponds to the coded arrangement of the projections 146, the selected bail 142 will rotate a further amount to cause the closure of one of the contacts 151 to 159 associated therewith (Figs. 2 and 8).

In Fig. 1 there is shown, the levers 161 and 162, contacts 163 and 164, and bail member 165, comprising a duplicate character delay mechanism comparable to the levers 273 and 274, contacts 275 and 276 and bail member 277, respectively, disclosed and described in said Patent No. 2,786,567.

Also suitably mounted atop the record reader (Figs. 1 and 6) is a timing mechanism, indicated generally by the numeral 170 comparable to the timing mechanism or timer 304 disclosed in said copending application. The timer 170 consists of five separate, frictionally driven timing elements 181 to 185 carried on a shaft 176, each element being controlled by an individual tripping device under the control of an individual magnet 171 to 175. For example, in response to the closing of contacts 163 and 164, in the manner described in said Patent No. 2,786,567, for introducing a time delay when duplicate characters are selected, a circuit is established through contact 163 for the energization of magnet 186 (Fig. 8) for arresting the operation of the record reader 54. At the same time a circuit for the energization of relay 187 is completed also through contact 163. Relay 187 upon energizing closes its contact 188 and opens its contact 189. The closure of contact 188 establishes a locking circuit for magnet 186 through control switches 191 and 192 in the composing machine, manual control contact 193 in the control unit (exemplified by frame 21) and normally closed contacts 194 to 198 of timer sections 181 to 185, respectively, thence to battery 199.

Simultaneously, the closure of contact 164 causes the energization of start or trip magnet 175 to introduce a proper timing interval terminated by the closure of contact 201 and the opening of contact 198 as described in said Patent No. 2,786,567. The closure of contact 201 causes the energization of magnet 202 (comparable to magnet 315 of said patent) to initiate the operation of the actuating unit as disclosed in said patent, said magnet 202 being cyclically energized normally through pulsing contact 203 and contact 189 (when normally closed). More specifically, as set forth in said patent, the magnet 202 (which is analogous to said magnet 315 shown in Fig. 13 of said patent) acts to initiate the rotation of shaft 50 when contact 203 is closed cyclically by cam 200 fixed to the tape reader shaft 45 (Fig. 6). During normal operation, the tape reader shaft 45 is constantly rotating and is stopped and restarted automatically only in response to predetermined function code signals, whose functions require a predetermined delay.

Thus, when the add-fixed-space code signal, described in said patent, is read by the reader 54, the depending portions 141 of bars 115 are set correspondingly to effect the selection and closure of contact 153. As also mentioned in said patent, contact 154 is a universal contact and is closed each time one of the contacts 151, 152, 153 and 155 to 159 is closed. Upon closure of contact 153 the start magnet 174 is energized to inititate the rotation of the timer section 184. Simultaneously, the closure of the universal contact 154 causes the energization of reader magnet 186 to arrest the reading operation, and also to energize the relay 187 to provide, through contact 188 (when closed) a locking circuit for magnet 186 through contacts 191 to 198 to battery 199 as previously described. The pulsing circuit for magnet 202 is broken at contact 189 (now open). The timing interval for the add-fixed-space function is then controlled by the rotation of timer section 184 until contact 197 is opened and contact 204 is closed, whereupon the locking circuit for reader magnet 186 is broken at contact 197, and a pulsing circuit for magnet 202 is established at contact 204. The timer section 184 is also provided with a cam 205 which functions in proper timed relation with the second closing of contact 204 and the ensuing energization of contact 202 to initiate a second cycle of operation of the actuating unit, to permit the shifting of the code changing bar or instrumentality 206 (Fig. 1) leftwardly for the purpose disclosed in said copending application.

Furthermore, when the upper-lower rail shift code signal, also described in said copending application, is read by the reader 54, the closure of contact 152 is effected. The universal contact 154 is also closed. Upon closure of contact 152, the start magnet 173 is energized to initiate the rotation of the timer section 183. Simultaneously, the closure of the universal contact 154 causes the energization of reader magnet 186 to arrest the reading operation, and also to energize the relay 187 to provide, through contact 188 a locking circuit for magnet 186 through contacts 191 to 198 to battery 199, as previously described. The pulsing circuit for magnet 202 is broken at contact 189 (now open). The timing interval for the upper-lower rail shift function is then controlled by the rotation of timer section 183 until contact 196 is opened, and contact 207 is closed, whereupon the locking circuit for reader magnet 186 is broken at contact 196, and a pulsing circuit for magnet 202 is established at contact 207.

As previously mentioned, it is sometimes desired to feed the perforated tape through the record reader 54 without causing the magnet 202 to initiate the operation of the automatic control mechanism, thereby suppressing the information perforated in that section or portion of the tape by preventing composition thereof into slugs or lines of type. Furthermore, it is desired at such times to feed said suppressed portions through the record reader 54 at a greater rate of speed. Although the tape reader shaft 45 is constantly rotating during this period of rapid tape reading, so that normally, cam 200 thereon cyclically closes the contact 203 to pulse the magnet 202, said pulsing circuit is broken during the rapid reading or stepping of the tape at contact 84 controlled by the speed control gear-shift arrangement including T-lever 73.

Accordingly, there has been provided a gear shift or speed changing arrangement comprising clutches 55 and 56 controlled selectively by the electromagnetically controlled shifting arrangement shown in Fig. 7. As previously mentioned, the operation of the gear shift arrangement 55—56 is controlled by special code indicia in the tape 131. For example, to initiate the rapid stepping or feeding of the tape, a predetermined code is perforated at the beginning of the portion to be suppressed which code indicia, when sensed by the reader 54, will cause through the proper permutative setting of bars 115, the selection of the bail 142 associated with contact 151 (Fig. 2).

Upon the closure of contact 151, the start magnet 172 (Fig. 8) is energized to initiate the rotation of the timer section 182. Simultaneously, the closure of the universal contact 154 causes the energization of reader magnet 186 to arrest the reading operation, and also to energize the relay 187 to provide, through contact 188 (when closed) a locking circuit for magnet 186 through contacts 191 to 198 to battery 199, as previously described. The pulsing circuit for magnet 202 is broken at contact 189 (now open).

The rotation of the timer portion 182 will effect the momentary closure of contact 208 to complete an energizing circuit for magnet 81 from battery 199, through contact 208. The magnet 81 upon energization will cause member 73 to rotate counterclockwise to open contact 84 and also, through its arm 72 cause the leftward movement (as viewed in Figs. 6 and 7) of shaft 57, thereby causing the clutch 56 to become engaged, and the clutch 55 to become disengaged, which is the condition (shown in Fig. 6) for higher speed operation. Pursuant to this condition, the tape is fed through the tape reader 54 at a faster rate, thus minimizing the time lost in the nonproductive reading of the tape.

To conclude the rapid stepping or feeding of the tape, a predetermined code is perforated at the end of the portion to be suppressed, which code indicia, when sensed by the reader 54, will effect a setting of sensing levers 126 corresponding to the permutative arrangement of code projections 89 on the bail member 91 (Fig. 1). When this condition obtains, the bail 91 will be permitted to rotate counterclockwise by spring 139 to cause extremity 93 to close contacts 94 and 95.

Upon the closure of contact 94 (Fig. 8), the start magnet 171 is energized to initiate the rotation of the timer section 181. Since the contacts 151 to 159 are not operated at this time, the universal contact 154 is not actuated and hence cannot control the reader magnet 186. Instead, the contact 95 is closed simultaneously with contact 94 to complete a circuit for the energization of magnet 186 from battery 209, through contact 95 (closed momentarily) over conductors 211, 212, 213 and 214, through the winding of magnet 186 to ground. Magnet 186 upon energizing, functions to arrest the reading operation. Also, the closure of contact 95 completes an energizing circuit over conductors 211, 212, 213 and 215 for relay 187 to provide, through contact 188 (when closed) a locking circuit for magnet 186, through said contacts 191 to 198, to battery 199, as previously described. The pulsing circuit for magnet 202 is broken at contact 189 (now open).

The rotation of the timer portion 181 will effect the momentary closure of contact 216 to complete an energizing circuit for magnet 82 from battery 199 through contact 216. The magnet 82 upon energization will cause member 73 to rotate clockwise to permit contact 84 to close and also through its arm 72 cause the rightward movement (as viewed in Figs. 6 and 7) of shaft 57, thereby causing the clutch 56 to become disengaged and the clutch 55 to become engaged, which is the condition for lower speed operation. Detent means, well known in the art, may be provided to hold member 73 in its clockwise and counterclockwise positions, respectively. Thus, pursuant to this condition of operation, the tape 131 is fed through the tape reader 54 at the normal rate of speed to effectuate the selective operation of the operating unit in the manner disclosed in said Patent No. 2,786,567.

As stated in said patent, contact 217 is representative of the various safety contacts on the linecasting machine 218, the closure of any one of which will arrest the operation of the control unit. When this has occurred, and after the trouble on the linecasting machine has been cleared, the control unit can be restarted by the manual opening of contact 193. When the control unit is in the idle condition, the manually operated contact 219 is closed to complete an obvious circuit for the magnet 186 which locks up as previously described, it being remembered that the energized condition of magnet 186 holds the tape reading clutch 65 disengaged. Contacts 155 to 159, inclusive, are associated with such features as quadding and centering, and upper and lower magazine selection, not herein described since such features are essentially a part of the linecasting and composing machine.

Although a specific embodiment of the invention has been shown in the drawings and described in the accompanying specification, it is understood that this invention is not limited thereto, but is capable of modification and rearrangement without departing from the spirit and scope of the invention.

What is claimed is:

1. In an automatic control unit for linecasting and composing machines, a plurality of selectable elements, permutation means responsive to code perforations in a tape for controlling the operation of the said selectable elements, said permutation means comprising a tape reading device having a series of tape sensing elements, dually controlled means for actuating said tape reading device under two conditions of operation, selectable means effective under the control of said tape reading device in response to a first predetermined code indicia in the tape for controlling said dually controlled means under one of said conditions of operation, and reading means cooperable in code reading manner with said tape sensing elements, said reading means effective in response to a predetermined setting of said tape sensing elements in response to a second predetermined code indicia in the tape for controlling said dually controlled means under the other of said conditions of operation.

2. In an automatic control unit for linecasting and composing machines, a plurality of selectable elements, permutation means responsive to code perforations in a tape for controlling the operation of the said selectable elements, said permutation means comprising a tape reading device having a series of tape sensing elements, driving means, driven means for actuating said tape reading device, speed changing means between said driving means and said driven means for imparting two conditions of operation to said tape reading device, selectable means effective under the control of said tape reading device in response to a first predetermined code indicia in the tape for controlling said speed changing means under one of said conditions of operation, and reading means cooperable in code reading manner with said tape sensing elements, said reading means effective in response to a predetermined setting of said tape sensing elements in response to a second predetermined code indicia in the tape for controlling said speed changing means under the other of said conditions of operation.

3. In an automatic means for controlling the functions of a linecasting and composing machine, permutation means responsive to code indicia in a tape, function determining means governed by said permutation means, said permutation means comprising a tape reading device having a series of tape sensing elements, driving means, driven means for actuating said tape reading device, speed changing means between said driving means and said driven means for imparting two conditions of operation to said tape reading device, initial means effective under the control of said permutation means in response to a first predetermined code indicia in the tape for controlling said speed changing means under one of said conditions of operation, final reading means cooperable in code reading manner with said tape sensing elements, said reading means effective in response to a predetermined setting of said tape sensing elements in response to a second predetermined code indicia in the tape for controlling said speed changing means under the other of said conditions of operation, and means effective during said one of said conditions of operation for preventing the effectiveness of said function determining means.

4. In an automatic control unit for linecasting and composing machines, a plurality of function control elements, mechanism responsive to perforations in a tape for controlling the operation of the function control elements, said mechanism comprising a tape reading device having a series of tape sensing elements, driving means, driven means for actuating said tape reading device, speed changing means between said driving means and said driven means for imparting two conditions of operation to said tape reading device, dually controlled clutch means cooperably related to said speed changing device, electromagnetically controlled means for rendering said dually controlled clutch means effective for imparting one or the other of said two conditions of operation to said tape reading device, reading means cooperable in code reading manner with said tape sensing elements, and circuit means controlled alternatively by said mechanism and said reading means for controlling through said electromagnetically controlled means the effectiveness of said dually controlled clutch means.

5. In an automatic control unit for linecasting and composing machines, a plurality of function control elements, permutation bars, mechanism responsive to code perforations in a tape for setting said permutation bars in varying permutations to control said function control elements, said mechanism comprising tape sensing elements, driving means, driven means for actuating said mechanism, speed changing means between said driving means and said driven means for imparting two conditions of operation to said mechanism, dually controlled clutch means cooperably related to said speed changing device, electromagnetically controlled means for rendering said dually controlled clutch means effective for imparting one or the other of said two conditions of operation to said mechanism, reading means cooperable in code reading manner with said tape sensing elements, circuit means controlled alternatively by said permutation bars and said reading means for controlling through said electromagnetically controlled means the effectiveness of said dually controlled clutch means, and means effective during one of said conditions of operation for precluding the operation of said function control elements.

6. In an automatic control unit for linecasting and composing machines, a plurailty of function control elements, permutation means responsive to code perforations in a tape for controlling the operation of the function control elements, said permutation means comprising a tape reading device having a series of tape sensing elements, dually controlled means for actuating said tape reading device under two conditions of operation, means effective in response to a predetermined setting of said permutation means for controlling said dually controlled means under one of said conditions of operation, and coded bail means cooperable in code reading manner with said sensing elements in response to a predetermined setting of said tape sensing elements for controlling said dually controlled means under the other of said conditions of operation.

7. In an automatic control unit for linecasting and composing machines, a plurality of function control elements, permutation means responsive to code perforations in a tape for controlling the operation of the function control elements, said permutation means comprising a tape reading device having a series of tape sensing elements, speed control means comprising dually controlled clutch means for actuating said tape reading device under two conditions of operation, electro-mechanical means for rendering said dually controlled clutch means effective for imparting one or the other of said two conditions of operation to said tape reading device, coded bail means cooperable in code reading manner with said tape sensing elements, and circuit means controlled alternatively by said permutation means and said coded bail means for controlling through said electro-mechanical means the effectiveness of said dually controlled clutch means.

8. In an automatic control unit for linecasting and composing machines, a plurality of function control elements, permutation means responsive to code perforations in a tape for controlling the operation of the function control elements, said permutation means comprising a tape reading device having a series of tape sensing elements, speed control means comprising dually controlled clutch means for actuating said tape reading device under two conditions of operation, electro-mechanical means for rendering said dually controlled clutch means effective for imparting one or the other of said two conditions of operation to said tape reading device, coded bail means cooperable in code reading manner with said tape sensing elements, circuit means controlled alternatively by said permutation means and said coded bail means for controlling through said electro-mechanical means the effectiveness of said dually controlled clutch means, and means effective during one of said conditions of operation for precluding the operation of said function control elements.

9. In an automatic control unit for linecasting and composing machines, a plurality of function control elements, permutation bars, tape reading mechanism responsive to code perforations in a tape for setting said permutation bars in varying permutations to control said function control elements, said mechanism comprising tape sensing elements, driving means, driven means for actuating said mechanism, speed changing means between said driving means and said driven means, said speed changing means comprising dually controlled clutch means for actuating said tape reading mechanism under two conditions of operation, electro-mechanical means for rendering said dually controlled clutch means effective for imparting one or the other of said two conditions of operation to said tape reading mechanism, means effective in response to a predetermined setting of said permutation bars for controlling through said electro-mechanical means said dually controlled clutch means under one of said conditions of operation, and coded bail means cooperable in code reading manner with said tape sensing elements in response to a predetermined setting of said tape sensing elements for controlling through said electro-mechanical means said dually controlled clutch means under the other of said conditions of operation.

References Cited in the file of this patent

UNITED STATES PATENTS

| | | |
|---|---|---|
| 1,606,126 | Houston | Nov. 9, 1926 |
| 2,297,789 | Mills et al. | Oct. 6, 1942 |
| 2,786,567 | Goetz | Mar. 26, 1957 |